United States Patent [19]

Formanek

[11] Patent Number: 5,263,058
[45] Date of Patent: Nov. 16, 1993

[54] PROJECTABLE PLUG ASSEMBLY FOR CORE BARREL FLOW HOLE AND INSTALLATION METHOD THEREFOR

[75] Inventor: Frank J. Formanek, West Suffield, Conn.

[73] Assignee: Combustion Engineering, Inc., Windsor, Conn.

[21] Appl. No.: 839,091

[22] Filed: Feb. 20, 1992

[51] Int. Cl.$^5$ .............................................. G21C 13/00
[52] U.S. Cl. ..................................... 376/203; 376/204
[58] Field of Search ............... 376/203, 204; 220/352; 976/DIG. 175, DIG. 176

[56] References Cited

U.S. PATENT DOCUMENTS

| | | | |
|---|---|---|---|
| 3,653,410 | 4/1972 | West | 376/203 |
| 4,454,957 | 6/1984 | Kwech et al. | 220/323 |
| 4,576,778 | 3/1986 | Ferree et al. | 376/203 |
| 4,820,476 | 4/1989 | Popalis | 376/203 |

*Primary Examiner*—Donald P. Walsh
*Assistant Examiner*—Meena Chelliah
*Attorney, Agent, or Firm*—Chilton, Alix & Van Kirk

[57] ABSTRACT

A plug assembly for plugging the flow hole of a core support barrel employs a pair of plug members which are initially collapsable to permit positioning between the core support barrel and the adjacent thermal shield. The plug assembly is activated to a projected plugged configuration by pneumatic or hydraulic pressure to provide a sealing engagement by a cooperative arrangement between circumferential locking barbs and a sealing lip.

15 Claims, 2 Drawing Sheets

PROJECTABLE PLUG ASSEMBLY FOR CORE BARREL FLOW HOLE AND INSTALLATION METHOD THEREFOR

BACKGROUND OF THE INVENTION

This invention relates generally to devices and techniques for plugging flow holes. More particularly, the present invention relates generally to devices and techniques for plugging the flow holes of the core support barrel of a nuclear reactor.

In some nuclear installations, fuel rod wear has been directly associated with the characteristics of the flow path through the reactor core. For example, it has been established that baffle jetting causes fuel rod wear under certain conditions. In some installations, the flow characteristics can be suitably modified to alleviate the wear to the fuel rod by modifying the reactor core flow path to an upflow-type core flow path. In order to implement the flow modification, it is necessary that existing core barrel flow holes be plugged. In some reactor designs, this may require the plugging of 16 angularly spaced core barrel flow holes. Moreover, the flow holes to be plugged are typically positioned below the level of the adjacent surrounding thermal shield, and thus the thermal shield may present a significant obstacle to the hole plugging process.

SUMMARY OF THE INVENTION

Briefly stated, the invention in a preferred form is a plug assembly and a plugging technique for a core barrel flow hole wherein a shield surrounds the barrel and is spaced adjacent to the flow hole.

The plug assembly for plugging the core barrel flow hole comprises a pair of cooperative plug members which are initially retractable and during installation are axially projectable under fluid pressure. One of the plug members includes a plurality of circumferential sealing barbs which are dimensioned to compressively engage the wall of the flow hole. The second seal member, which is axially slidable relative to the first member, comprises an internal locking barb. The plug assembly is insertable into the flow hole, and the second member is subsequently projectable under hydraulic or automatic pressure to axially displace inwardly into the core barrel interior to a position wherein the internal locking barb engages the inside surface of the core barrel to thereby seal the plug.

An object of the invention is to provide a new and improved plug assembly and installation technique for plugging the flow hole of a core support barrel.

Another object of the invention is to provide a new and improved plug assembly which may be installed to the core barrel in an efficient process to provide a plug of high integrity.

A further object of the invention is to provide a new and improved plug assembly and installation method therefor which is designed to overcome the headroom constraints presented by the thermal shield.

Other objects of the invention will become apparent from the drawings and specification.

DETAILED DESCRIPTION OF THE PREFERRED EMBODIMENT

Figure 1:
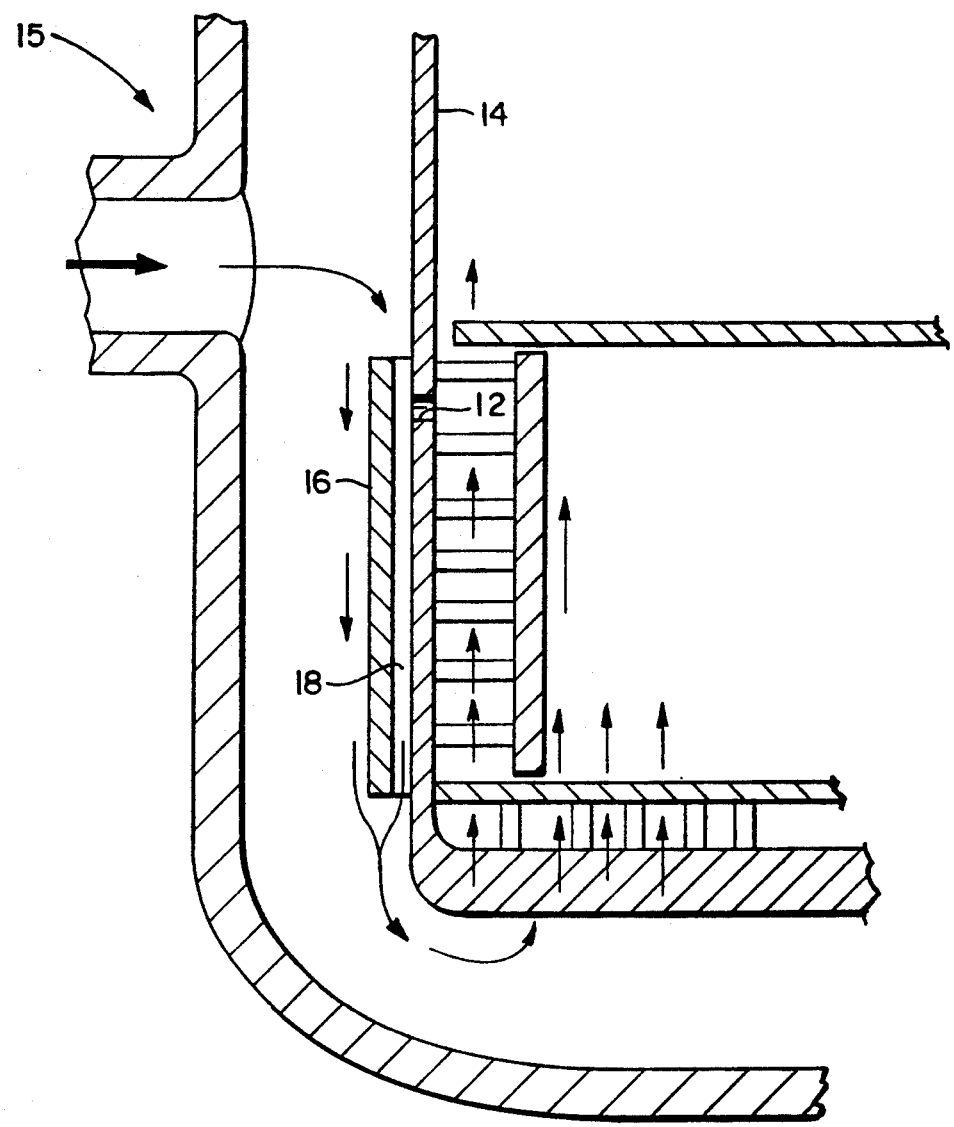
FIG. 1 is a fragmentary sectional view, partly broken away and partly in schematic, of a nuclear reactor for which the present invention has application.
Figure 2:
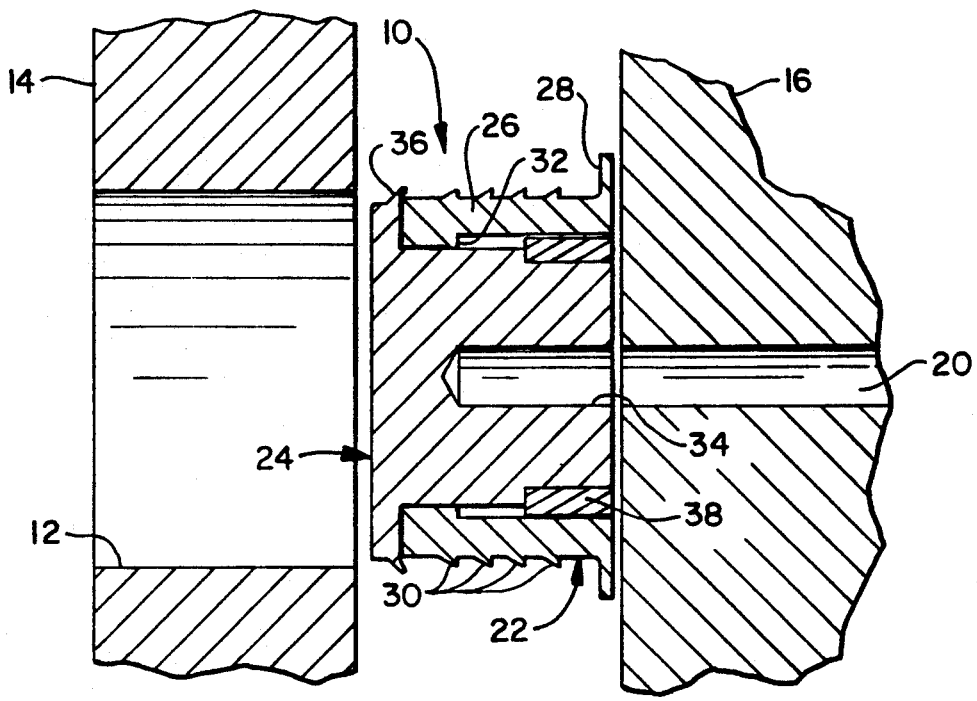
FIG. 2 is an enlarged fragmentary sectional view of a portion of the reactor of FIG. 1, illustrated in conjunction with a plug assembly in accordance with the present invention, said plug assembly being illustrated in a pre-installation configuration.
Figure 3:
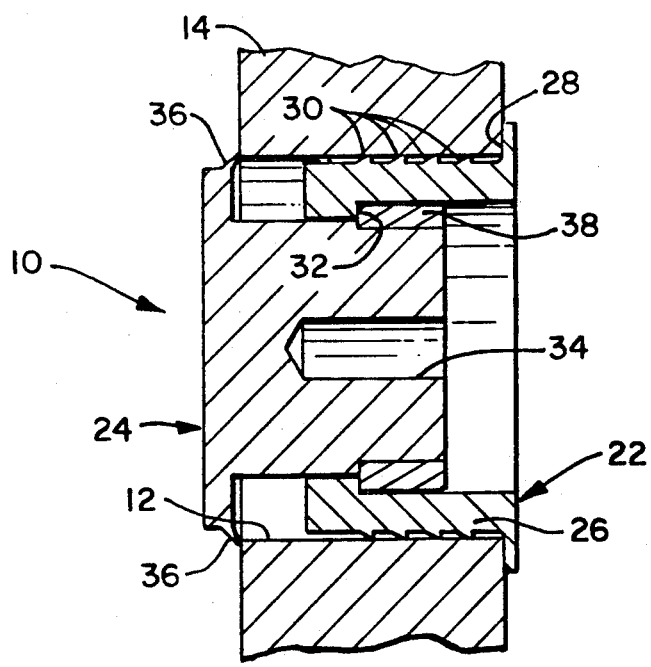
FIG. 3 is an enlarged sectional view of the plug assembly and a portion of the reactor of FIG. 2, said plug assembly being illustrated in an installed configuration.

With reference to the drawings wherein like numerals represent like parts throughout the figures, a plug assembly, in accordance with the present invention, is generally designated by the numeral 10 in FIGS. 2 and 3. The plug assembly 10 has essentially a two piece construction manufactured from an anti-galling stainless steel alloy stock. The plug assembly is especially adapted to plug flow holes 12 which are existent in the core support barrel 14 of a nuclear reactor illustrated generally by the numeral 15 in FIG. 1. A thermal neutron shield 16 surrounds the core barrel. The shield 16 is positioned in adjacent spaced relationship relative to the flow holes 12 for which the invention has particular applicability. An annulus 18 is thus formed between the inner surface of the neutron shield 16 and the core support barrel 14. The annulus 18, which for many installations is typically on the order of 2 inches, presents a significant headroom constraint at the immediate vicinity of the flow holes which require plugging.

In one application for the invention, in order to modify the core reactor flow path to alleviate fuel rod wear due to coolant flow characteristics, plugging of the flow holes is required. A possible coolant flow path modification is represented by the arrows in FIG. 1. In the typical installation for which the present invention has applicability there are 16 angularly spaced flow holes 12 in the core support barrel. Each of the flow holes 12 has a diameter of approximately three inches. The juxtaposition of the thermal shield 16 relative to the flow holes presents a significant obstacle to the plugging operation and significantly increases the difficulties of installation of a plug. It is ordinarily desirable that the thermal shield 16 remain intact and that the plug assembly be installed without removing the thermal shield. Machining access bores in the thermal shield may be acceptable for certain installations.

With reference to FIGS. 2 and 3, the plug assembly 10 for flow hole 12 is illustrated in respective pre-installation and installed configurations. The plug assembly 10 requires that an access bore 20 be drilled through the thermal shield 16. The access bore 20 may be as small as ½ inch in diameter and is machined in precise centered alignment opposite the core barrel flow hole 12.

The plug assembly 10 comprises two cooperative plug members 22 and 24 which are relatively collapsable and projectable. The first plug member 22 has a sleeve-like body 26 and includes a circumferential flange-like sealing lip 28 which is machined to seal the outer circumferential barrel edge of the flow hole 12. The sleeve-like outer plug member 22 includes four circumferentially extending barbs 30 which, upon insertion of the plug, are dimensioned to frictionally engage and seal the inner wall of the flow hole around a 360° interface. The barbs 30 are angled toward the sealing lip 28 to resist withdrawal of the plug assembly. The outer plug member 22 terminates in an integral inner rim-like shoulder 32.

The inner plug member 24 is received in body 26 and is axially slidable relative to the outer member. The plug assembly 10 is collapsable to less than 1¾ inches to permit the plug assembly to be passed into the annulus 18, as best illustrated in FIG. 2. The inner plug member 24 includes a locking barb 36 which circumferentially subtends an angle of 360°. The barb 36 is oriented and dimensioned to slide along the flow hole wall and eventually release so that it surrounds and engages at the inside edge of the flow hole. The inner plug member 24 has a central axial bore 34, which opens toward the sealing lip 28 portion of the assembly and aligns with the access bore 20. A retaining ring 38 fixed to plug member 24 is engageable with the shoulder 32 to limit the inward axial position of the inner plug member 24 relative to the outer member 22.

As best illustrated in FIG. 2, the plug assembly 10 is collapsed to permit the assembly to be passed in annulus 18 between the core barrel and the thermal shield until the plug is positioned opposite the flow hole 12. The inner member 24 of the plug assembly is forcibly inserted into the flow hole under hydraulic or pneumatic pressure supplied via a ram (not illustrated) through the access bore 20 in the thermal shield. The ram is engaged through bore 34. After a brief period of lost motion between the plug members, the retaining ring 38 engages shoulder 32 and the plug members 22, 24 move together until the locking barb 36 on the inner member passes inwardly through the hole, releases from the hole wall and expands and locks on the inner surface of the core support barrel. The locking barbs 30 provide a centering function. The locking barbs 30 on the outer member engage the inner wall of the flow hole to resist withdrawal of the plug assembly, and the locking sealing lip 28 engages the outer surface of the core support barrel to seal the plug with the core support barrel.

The access bore 20 in the thermal shield may be sealed with a plug assembly (not illustrated) which is similar to plug assembly 10 except it is dimensioned to accommodate the dimensions of the access bore.

While the preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A plug assembly for a core barrel flow hole comprising:
    first plug means comprising a sleeve-like member having axially spaced first and second end portions and an intermediate body portion, said first end portion comprising a circumferential sealing lip dimensioned to engage said core barrel around the periphery of said flow hole, said second end portion comprising an interior retaining shoulder, and at least one locking barb projecting from said body portion and dimensioned to frictionally engage the wall of said flow hole; and
    second plug means axially slidably received by said first plug means and relatively positionable between a collapsed nested position and a projected axial position, said second plug means comprising a stop which engages said retaining shoulder at the projected position and a circumferential lock barb which is dimensioned to engage the inner barrel surface around said flow hole so that in the projected position, said second plug means barb engages the inner wall of the barrel, the at least one locking barb engages the wall defining the flow hole, and the lip engages the outer surface of the barrel to thereby plug the flow hole.

2. The plug assembly of claim 1 wherein said first plug means comprises four substantially identical locking barbs.

3. The plug assembly of claim 2 wherein the locking barbs subtend an angle of 360° relative to a central axis.

4. The plug assembly of claim 1 wherein said second plug means further defines an axial bore.

5. The plug assembly of claim 1 wherein said second plug means barb extends forwardly at an acute angle toward said first plug means.

6. A method for plugging a flow hole of a core barrel having a shield surrounding said barrel and outwardly spaced from said hole comprising:
    providing a plug assembly comprising a pair of axially spaced plug members each having opposed sealing structures for engaging opposing hole edge portions of said barrel, said members being relatively positionable between a collapsed and a projected axial configuration;
    moving said plug assembly between said barrel and said shield while said plug assembly is in the collapsed configuration and positioning said plug assembly generally opposite said flow hole; and
    applying an inwardly directed force to said plug assembly to force said plug assembly into said flow hole and displace said plug assembly to the projected configuration so that said sealing structures engage opposed hole edge portions of said barrel.

7. The method of claim 6 further comprising forming an access bore in said shield generally opposite said flow hole.

8. The method of claim 7 wherein the step of applying an inwardly directed force further comprises supplying a ramming force through said access bore.

9. The method of claim 8 wherein said ramming force is exerted against one plug member.

10. A nuclear reactor assembly comprising:
    core barrel means defining a flow hole having a wall and opening through opposing barrel surfaces;
    first plug means comprising a sleeve-like structure having axially spaced first and second end portions and an intermediate body portion, said first end portion comprising a circumferential sealing lip dimensioned to engage one said core barrel surface around the periphery of said flow hole, and at least one locking barb projecting from said body portion and dimensioned to frictionally engage the wall of said flow hole; and
    second plug means axially received by said first plug means, said second plug means comprising a circumferential lock barb which is dimensioned to engage the other barrel surface around said flow hole so that said second plug means barb engages one barrel surface, the at least one locking barb engages the wall defining the flow hole, and the lip engages the other barrel surface to thereby plug the opening.

11. The assembly of claim 10 wherein said first plug means comprises at least four substantially identical locking barbs which engage the wall of the flow hole.

12. The assembly of claim 11 wherein the locking barbs subtend an angle of 360° relative to a central axis.

13. The assembly of claim 10 wherein said second plug means further defines an axial bore.

14. The assembly of claim 10 wherein said second plug means barb extends forwardly at an acute angle toward said first plug means.

15. The assembly of claim 10 wherein said second end portion comprises an interior retaining shoulder and said second plug means comprises a stop which engages said retaining shoulder.

* * * * *